(12) United States Patent
Ohtaki et al.

(10) Patent No.: US 7,290,416 B2
(45) Date of Patent: Nov. 6, 2007

(54) ENGINE SWITCH DEVICE

(75) Inventors: Kiyokazu Ohtaki, Niwa-gun (JP); Seiji Ishigaki, Niwa-gun (JP); Tomoyuki Funayama, Toyota (JP); Yoshinori Fukuoka, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 74 days.

(21) Appl. No.: 10/771,978

(22) Filed: Feb. 4, 2004

(65) Prior Publication Data

US 2004/0155525 A1 Aug. 12, 2004

(30) Foreign Application Priority Data

Feb. 6, 2003 (JP) .............................. 2003-030015

(51) Int. Cl.
*B60R 25/02* (2006.01)
(52) U.S. Cl. ............ 70/252; 70/278.3; 70/279.1; 70/DIG. 30; 200/43.08
(58) Field of Classification Search ............... 70/252, 70/182–186, DIG. 30, 241, 243, 248, 250, 70/251, 257, 253–255, 239, 279.1, 360, 361, 70/408, 413, 278.3, 278.7, 283.1; 200/43.08, 200/50.32, 50.36, 50.37, 50.34; 292/DIG. 37; 307/10.3, 10.4, 10.5, 10.6
See application file for complete search history.

(56) References Cited

U.S. PATENT DOCUMENTS

| | | | | |
|---|---|---|---|---|
| 1,748,255 A | * | 2/1930 | Tibbetts | 70/285 |
| 2,060,951 A | * | 11/1936 | Rae et al. | 200/43.11 |
| 3,522,394 A | * | 7/1970 | Bellrose | 200/43.08 |
| 3,794,796 A | * | 2/1974 | Dwan | 200/43.11 |
| 4,154,992 A | * | 5/1979 | Aspman | 200/43.08 |
| 4,956,983 A | * | 9/1990 | Okamura et al. | 70/241 |
| 5,799,520 A | * | 9/1998 | Laabs et al. | 70/360 |
| 5,836,187 A | * | 11/1998 | Janssen et al. | 70/252 |
| 5,927,112 A | * | 7/1999 | Yamashita | 70/252 |
| 5,982,295 A | * | 11/1999 | Goto et al. | 340/10.52 |
| 6,751,991 B2 | * | 6/2004 | Tamukai | 70/186 |
| 6,776,016 B1 | * | 8/2004 | Wittwer et al. | 70/252 |

FOREIGN PATENT DOCUMENTS

| | | |
|---|---|---|
| DE | 19520211 | 2/1996 |
| DE | 19943999 | 4/2001 |
| EP | 1 088 716 A2 | 4/2001 |
| EP | 1 211 148 | 6/2002 |
| JP | 2002-295089 | 10/2002 |
| JP | 2003291778 | 10/2003 |

OTHER PUBLICATIONS

European Search Report, dated Dec. 28, 2004, issued in corresponding European Application No. EP 04 00 2329.

* cited by examiner

*Primary Examiner*—Lloyd A. Gall
(74) *Attorney, Agent, or Firm*—Synnestvedt & Lechner LLP (57) ABSTRACT

An engine switch device with improved convenience. The device starts and stops an engine. The device includes a key cylinder, which has a key slot, and a push button switch, which is pushed to stop or start the engine. The key slot is located in the center of the push button in a preferred embodiment.

17 Claims, 4 Drawing Sheets

ENGINE SWITCH DEVICE

BACKGROUND OF THE INVENTION

The present invention relates to an engine switch device for starting and stopping an engine in a vehicle provided with a smart ignition function, and more particularly, to an engine switch device including a push button switch for starting the engine.

Vehicles provided with smart ignition functions are known in the prior art. In a vehicle provided with a smart ignition function, when a user carrying a portable device having an exclusive identification code, enters the vehicle, the vehicle compares the identification code of the portable device with an identification code of the vehicle. When the two identification codes match, starting of the engine is enabled. Subsequently, the user starts the engine by operating a switch in the passenger compartment without using a mechanical key. A switch, such as a push button switch, has been proposed to be employed in a vehicle provided with the smart ignition function. When the smart ignition function enables the engine to be started, the user pushes the push button switch to start the engine. A key cylinder is arranged in front of the driver's seat so that the user may use the mechanical key to start the engine during an emergency, such as when the battery of the portable device is drained. In such a case, the user inserts the mechanical key into the key cylinder through a key slot and turns the mechanical key to start the engine.

Smart ignition devices that employ switches other than a push button switch have also been proposed. For example, Japanese Laid-Open Patent Publication No. 2002-295089 describes a device employing a rotary ignition switch. When starting of the engine is enabled, the user turns the rotary ignition switch to start the engine. The rotary ignition switch is arranged surrounding the key slot that receives the mechanical key.

When the key cylinder and the push button switch are arranged at separate positions, space for the push button switch and space for the key cylinder at two locations must be prepared. Further, the user may forget where the key cylinder is located if he or she normally does not use the mechanical key and uses the smart ignition function to start the engine. However, such a user would have to start the engine with the mechanical key when, for example, the battery of the portable device is drained. Under such circumstances, the user may not be able to immediately locate the key cylinder, which is separated from the push button switch. Conversely, a user who normally uses the mechanical key may not be able to immediately locate the key cylinder. In such manner, the switch device is not convenient when the key cylinder and the push button switch are separated from each other.

In the switch device of Japanese Laid-open Patent Publication No. 2002-295089, the rotary ignition switch is arranged surrounding the key slot. However, the turning of the rotary ignition switch is more of a task than pushing the push button switch with one action. This lowers the convenience of the switch device.

SUMMARY OF THE INVENTION

It is an object of the present invention to provide an engine switch device that includes a key cylinder and a push button switch with improved convenience.

To achieve the above object, the present invention provides an engine switch device for use in a vehicle to start and stop an engine. The switch device includes a key cylinder having a key slot. A push button switch is pushed to stop or start the engine. The push button switch includes a push button surrounding the key slot.

Another aspect of the present invention is an engine switch device for use in a vehicle to start and stop an engine. The switch device includes a key cylinder having a key slot. A push button switch is pushed to stop or start the engine. The push button switch includes a push button. The key slot is arranged in the push button.

A further aspect of the present invention is an engine switch device for use in a vehicle to start and stop an engine. The switch device includes a key cylinder having a key slot for receiving a mechanical key. The mechanical key includes a transponder having a communication function. A push button switch is pushed to stop or start the engine. The push button switch includes a push button having a hole. The push button includes a communicating means for communicating with the transponder. The key slot is arranged in the hole of the push button.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

An engine switch device 1 according to a first embodiment of the present invention will now be discussed with reference to FIGS. 1 to 3. The engine switch device 1 of the first embodiment is used in a vehicle provided with a smart ignition function. In addition, the vehicle of the first embodiment is provided with an immobilizer function for preventing the vehicle from being stolen.

Figure 1:
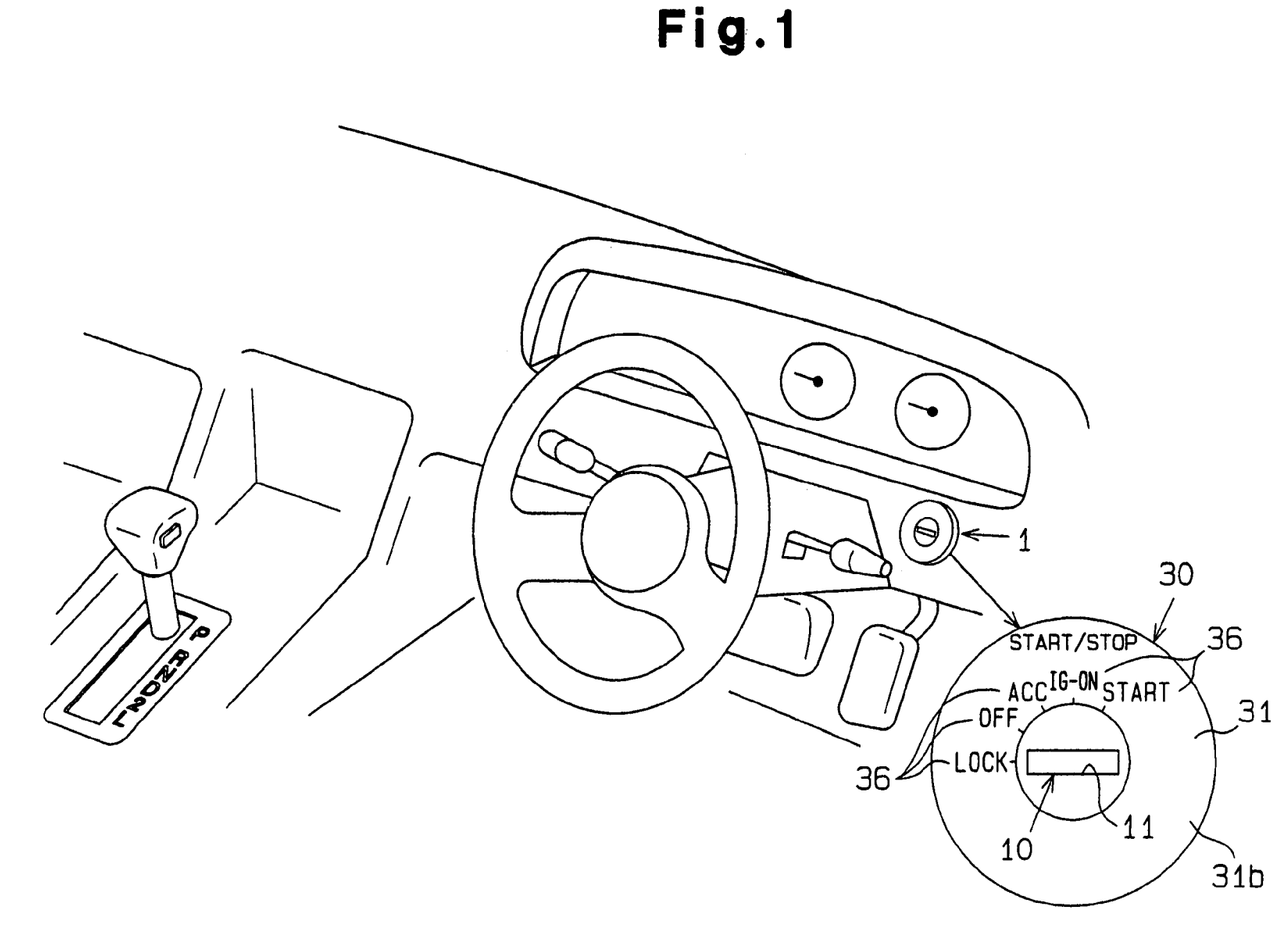
FIG. 1 is a schematic diagram showing an engine switch device according to a first embodiment of the present invention.

FIG. 1 is a schematic diagram showing the engine switch device 1. As shown in FIG. 1, the engine switch device 1 (hereafter simply referred to as switch device 1) is arranged in front of the driver's seat in the vehicle. The engine switch device 1 includes a key cylinder 10 and a push button switch 30. As shown in FIGS. 1 and 3, the push button switch 30 has an annular push button 31. The key cylinder 10 has a key slot 11, which is arranged in the center of the push button 31. In other words, the push button 31 surrounds the key slot 11. When the smart ignition function enables the engine to be started, the user of the vehicle pushes the push button 31 to start the engine.

Figure 2:
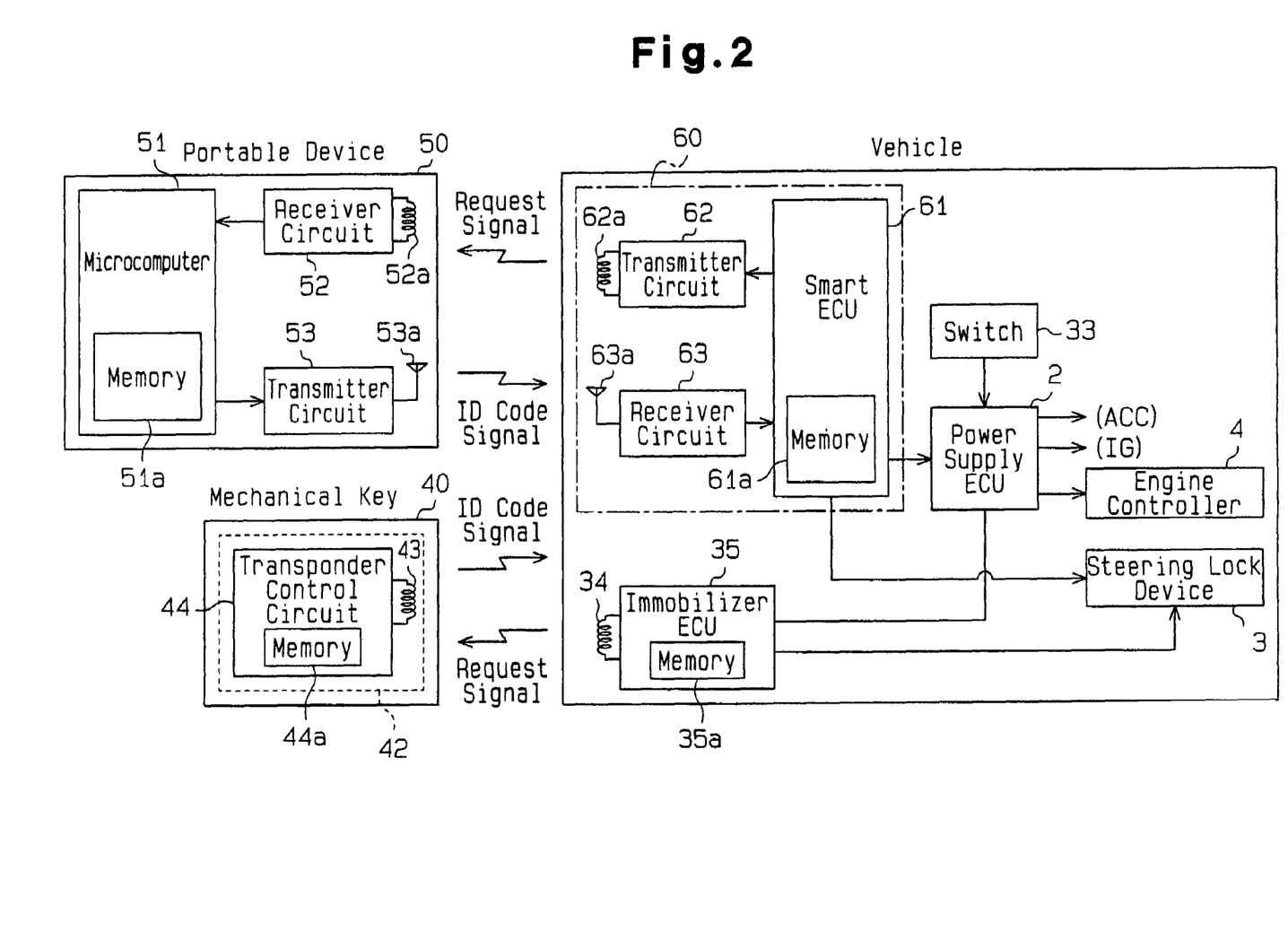
FIG. 2 is a schematic block diagram showing the switch device of the first embodiment arranged in a vehicle, a portable device, and a mechanical key.

FIG. 2 is a schematic block diagram of the vehicle, a mechanical key 40, and a portable device 50. The user carries the mechanical key 40 and the portable device 50. Devices, such as a transceiver 60, an immobilizer electronic control unit (ECU) 35, a power supply ECU 2, an engine controller 4, and a steering lock device 3, are installed in the vehicle.

Figure 3:
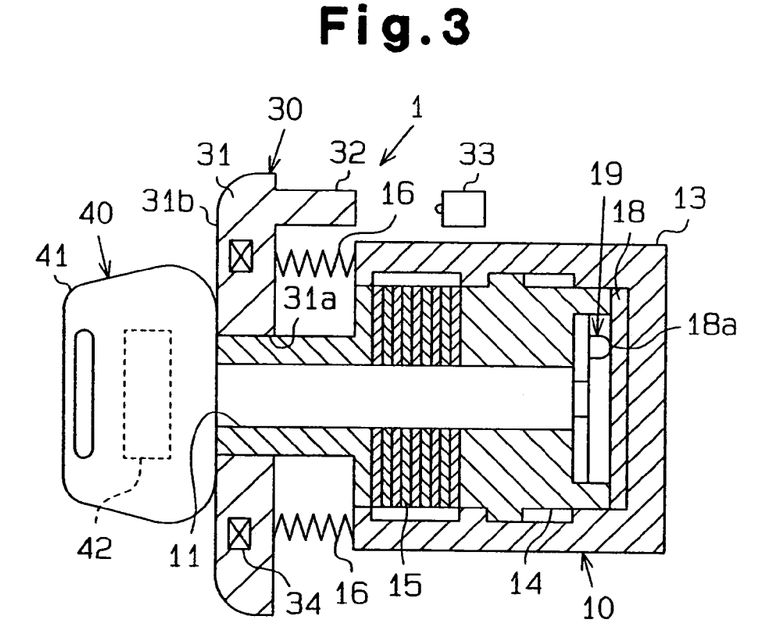
FIG. 3 is a schematic diagram showing the switch device according to the first embodiment.

Referring to FIG. 3, the key cylinder 10 has a structure similar to that of a normal key cylinder. The key cylinder 10 includes a rotor case 13 and a rotor 14, which is arranged in the rotor case 13. The rotor 14 includes the key slot 11, which receives the mechanical key 40. Further, the rotor 14 includes a plurality of tumblers 15. When the mechanical key 40 is inserted in the key slot 11, the tumblers 15 are all engaged with a key groove of the mechanical key 40. In this state, the ends of every tumbler 15 is retracted inward from the outer surface of the rotor 14. This enables the rotor 14 to be rotated. A projection 19 extends from the distal end of the rotor 14 towards the end wall of the rotor case 13. The rotation of the rotor 14 moves the projection 19 along an arcuate path.

A circuit board 18 is arranged on the end wall of the rotor case 13. An electric signal is provided to the power supply ECU 2 from the circuit board 18. The circuit board 18 includes five contacts 18a, which are arranged in correspondence with the moving path of the projection 19 to contact the projection 19. The contacts 18a are separated from each other by predetermined intervals. The five contacts 18a correspond to operation states represented by "LOCK", "OFF", "ACC", "IG-ON", and "START". Thus, when the mechanical key 40 is inserted in the key slot 11 and turned, the projection 19 contacts the five contacts 18a one by one. In other words, the contact 18a that comes into contact with the projection 19 is switched. This switches operation states, such as from "LOCK" to "OFF". In the "LOCK" state, the steering wheel is locked. In the "OFF" state, the steering wheel is unlocked but power is not supplied to the vehicle. In the "ACC" state, power is supplied to accessories. In the "IG-ON" state, power is supplied to every device installed in the vehicle in addition to the accessories. In the "START" state, the engine is started.

The push button switch 30 includes a push button 31 and a switch 33. A hole 31a extends through the center of the push button 31. The key slot 11 of the key cylinder 10 is arranged in the hole 31a. The push button 31 moves separately from the key cylinder 10 between a push position and a release position. The push button 31 includes a push surface 31b, which is flush with the surface of the key slot 11. The characters of START/STOP is marked on the push surface 31b so that the user can easily recognize the switch device 1. In addition, characters 36 indicating different operation states, such as "LOCK", "OFF", "ACC", "IG-ON", and "START" are marked on the push surface 31b (refer to FIG. 1). Accordingly, the user can easily recognize the operating states selectable by the mechanical key 40.

An extension 32 extends from the surface of the push button 31 on the opposite side of the push surface 31b. A guide (not shown), which extends in the axial direction of the rotor 14, guides the extension 32. The guide restricts lateral movement of the extension 32 and prevents the push button 31 from rotating about the rotor 14. A spring 16 is arranged between the push button 31 and the rotor case 13.

The spring 16 urges the push button 31 in a direction opposite to the direction in which the user pushes the push button 31. The switch 33 is located at a position corresponding to the extension 32. The switch 33 is a self-reset type push button switch. When the vehicle user pushes the push button 31, the push button 31 moves so that the extension 32 pushes the switch 33. This activates the switch 33 and provides the power supply ECU 2 with an ON signal. When the user stops pushing the push button 31, the force of the spring 16 returns the push button 31 to the release position.

The push button 31 includes an annular primary coil 34 (communicating means). The primary coil 34 is electrically connected to the immobilizer ECU 35 (FIG. 2) by a wire, such as a lead line or the like. The immobilizer ECU 35 includes a memory 35a, which stores an exclusive identification code. The vehicle battery (not shown) functions as the power supply for the immobilizer ECU 35. The immobilizer ECU 35 controls the oscillation of the primary coil 34 to intermittently transmit a request signal from the primary coil 34.

The mechanical key 40, which is inserted in the key slot 11, includes a grip 41. A transponder 42 is incorporated in the grip 41. The transponder 42 includes a secondary coil 43 and a transponder control circuit 44 (FIG. 2). The transponder control circuit 44 includes a memory 44a, which stores an exclusive identification code. When the mechanical key 40 is inserted in the key slot 11 of the key cylinder 10, the grip 41 is located near the push button 31 of the push button switch 30. Further, the secondary coil 43 of the grip 41 is located near the primary coil 34 of the push button 31. In this state, the primary coil 34 magnetically influences the secondary coil 43 and affects the magnetic flux extending through the secondary coil 43. Accordingly, induced electromotive force is generated in the secondary coil 43. The induced electromotive force of the secondary coil 43 drives the transponder control circuit 44.

When receiving a request signal from the primary coil 34 of the immobilizer ECU 35 via the secondary coil 43, the transponder control circuit 44 changes its impedance. In accordance with the change in the impedance, the oscillation state of the primary coil 34 changes. Based on the change in the oscillation state of the primary coil 34, the immobilizer ECU 35 reads an identification code of the mechanical key 40. The immobilizer ECU 35 compares the identification code of the transponder 42 with the identification code stored in the memory 35a. When the two identification codes match, the immobilizer ECU 35 provides the power supply ECU 2 with an immobilizer verification signal and provides the steering lock device 3 with an unlock signal.

When the two identification codes do not match, the immobilizer ECU 35 does not provide the power supply ECU 2 with the verification signal to disable the starting of the engine.

Referring to FIG. 2, the portable device 50 carried by the user includes a microcomputer 51, a receiver circuit 52, and a transmitter circuit 53. The receiver circuit 52 includes an antenna 52a. The transmitter circuit 53 includes an antenna 53a. The microcomputer 51 includes a memory 51a, which stores an identification code. The receiver circuit 52 receives a request signal from the vehicle via the antenna 52a and provides the request signal to the microcomputer 51. In response to the request signal, the microcomputer 51 reads the identification code from the memory 51a and provides the transmitter circuit 53 with an identification code signal. When receiving the identification code signal from the microcomputer 51, the transmitter circuit 53 transmits an identification code signal via the antenna 53a.

The transceiver 60 installed in the vehicle includes a smart ECU 61, a transmitter circuit 62, and a receiver circuit 63. The smart ECU 61 includes a memory 61a, which stores an identification code exclusive to the vehicle. The transmitter circuit 62 includes an antenna 62a. The receiver circuit 63 includes an antenna 63a. The smart ECU 61 intermittently provides the transmitter circuit 62 with a request signal. The transmitter circuit 62 transmits the request signal within a range near the vehicle via the antenna 62a. The receiver circuit 63 receives the identification code signal transmitted from the portable device 50 via the antenna 63a and provides the smart ECU 61 with the identification code signal. The smart ECU 61 compares the identification code included in the identification code signal from the portable device 50 with the identification code stored in the memory 61a. When the two identification codes match, the smart ECU 61 provides the power supply ECU 2 with a smart ignition verification signal and provides the steering lock device 3 with an unlock signal. In response to the unlock signal, the steering lock device 3 unlocks the steering wheel.

The power supply ECU 2 installed in the vehicle is connected to the smart ECU 61, the immobilizer ECU 35, the engine controller 4, and the switch 33 of the push button switch 30. The vehicle battery functions as the power source of the power supply ECU 2. When the smart ECU 61 provides the power supply ECU 2 with the smart ignition verification signal, the power supply ECU 2 provides the engine controller 4 with a start signal in response to an ON signal from the switch 33. Further, when the immobilizer ECU 35 provides the power supply ECU 2 with the immobilizer verification signal and the contact 18a of the circuit board 18 is switched to "START", the power supply ECU 2 provides the engine controller 4 with the start signal. Then, the engine controller 4 starts the engine in accordance with the start signal.

In a state in which the vehicle is not moving but the engine is running, if the push button 31 is pushed to provide the power supply ECU 2 with the ON signal from the switch 33, the power supply ECU 2 provides the engine controller 4 with a stop signal. Further, the turning of the mechanical key 40 from the "IG-ON" position to the "ACC" position provides the engine controller 4 with the stop signal. The engine controller 4 stops the engine in accordance with the stop signal. The switch device 1, the portable device 50, the transceiver 60 and the power supply ECU 2 configure a smart ignition device.

The operation of the switch device 1 of the first embodiment will now be described.

Stopping and Starting of Engine With Push Button Switch 30

The user, who is carrying the portable device 50, enters the vehicle. As a result, the identification code of the smart ECU 61 in the transceiver 60 and the identification code of the microcomputer 51 in the portable device 50 are compared with each other. When the two identification codes match, the smart ECU 61 provides the steering lock device 3 with the unlock signal and provides the power supply ECU 2 with a smart ignition verification signal. In accordance with the unlock signal, the steering lock device 3 unlocks the steering wheel. The user pushes the push button 31 of the push button switch 30.

When the push button 31 is pushed, the extension 32 activates the switch 33. As a result, the switch 33 provides the power supply ECU 2 with an ON signal. The power supply ECU 2 provides the engine controller 4 with a start signal in response to the ON signal. The engine controller 4 starts the engine in accordance with the start signal.

In a state in which the vehicle is not moving but the engine is running, when the user pushes the push button 31 and the switch 33 provides the power supply ECU 2 with an ON signal, the power supply ECU 2 provides the engine controller 4 with a stop signal. The engine controller 4 stops the engine in response to the stop signal.

Stopping and Starting of Engine With Key Cylinder 10

The user inserts the mechanical key 40 in the key slot 11 of the key cylinder 10. As a result, due to the immobilizer function, the identification code of the transponder 42 and the identification code of the immobilizer ECU 35 are compared with each other. When the two identification codes match, the immobilizer ECU 35 provides the steering lock device 3 with the unlock signal and provides the power supply ECU 2 with the immobilizer verification signal. In accordance with the unlock signal, the steering lock device 3 unlocks the steering wheel.

The mechanical key 40 is located at the LOCK position when the user first inserts the mechanical key 40 in the key slot 11. As the user turns the mechanical key 40 from the "LOCK" position to the "OFF" position, the projection 19 moves to the OFF contact 18a of the circuit board 18. As a result, the circuit board 18 provides the power supply ECU 2 with an OFF signal. In the "OFF" state, the power supply ECU 2 keeps the engine stopped.

Then, the user further turns the mechanical key 40 from the "OFF" position to the "ACC" position. This moves the projection 19 to the ACC contact 18a of the circuit board 18. As a result, the circuit board 18 provides the power supply ECU 2 with an ACC signal. When the power supply ECU 2 detects the ACC signal, the power supply ECU 2 determines the type of signal the immobilizer ECU 35 is providing. When the immobilizer ECU 35 is providing the power supply ECU 2 with the immobilizer verification signal, the power supply ECU 2 activates an ACC relay (not shown). The ACC relay is arranged along a power supply line that electrically connects the battery and the accessories. Accordingly, the activation of the ACC relay supplies the accessories with power from the battery.

The user then further turns the mechanical key 40 to the "IG-ON" position. This moves the projection 19 to the IG-ON contact 18a of the circuit board 18. As a result, the circuit board 18 provides the power supply ECU 2 with an IG-ON signal. In response to the IG-ON signal, the power supply ECU 2 activates a plug relay (not shown). This enables the engine to be started.

Subsequently, the user further turns the mechanical key 40 to the "START" position. In this state, the power supply ECU 2 provides the engine controller 4 with a start signal. The engine controller 4 starts the engine in response to the start signal. To stop the engine, the user turns the mechanical key 40 from the "IG-ON" position to the "ACC" position. As a result, the power supply ECU 2 provides the engine controller 4 with a stop signal. The engine controller 4 stops the engine in accordance with the stop signal.

The switch device 1 of the first embodiment has the advantages described below.

(1) The push button 31 of the push button switch 30 surrounds the key slot 11 of the key cylinder 10. Accordingly, the key cylinder 10 and the push button switch 30 are located at the same location.

Further, a user who normally uses the push button switch 30 to start the engine would be able to easily locate the key slot 11. Conversely, a user who normally uses the key cylinder 10 to start the engine would be able to easily locate the push button 31. This improves the convenience of the switch device 1.

(2) When the mechanical key 40 is inserted in the key slot 11, the primary coil 34 of the push button 31 is located near the secondary coil 43 of the grip 41. Accordingly, communication between the primary coil 34 and the secondary coil 43 is performed in a satisfactory state. Further, the primary coil 34 is incorporated in the push button 31. Thus, the push button switch 30 is compact in comparison to when the primary coil 34 is arranged outside the push button 31.

(3) The switch device 1 includes the push button switch 30. Thus, the user needs only to push the push button 31 to start the engine. Accordingly, the switch device 1 is extremely convenient.

(4) The push button 31 may be moved without moving the key cylinder 10. However, when the user accidentally touches both the push button 31 and the key cylinder 10 at the same time with the palm of his or her hand, the key cylinder 10 functions to restrict the movement of the push button 31. This prevents the user from accidentally starting the engine.

(5) The push surface 31b of the push button 31 is flush with the surface of the key slot 11 (i.e., the end face of the rotor 14). Thus, the push button 31 does not interfere with the mechanical key 40 (especially, the grip 41) when inserted in the key slot 11. This prevents the push button 31 from interfering with the operation of the mechanical key 40.

A switch device 1 according to a second embodiment of the present invention will now be described with reference to FIGS. 4, 5A, and 5B.

Figure 4:
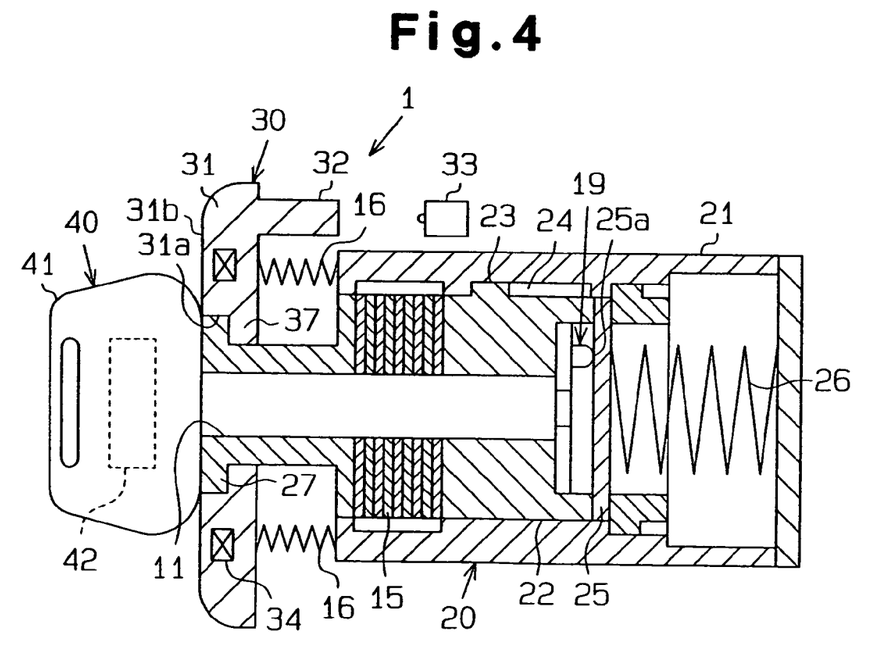
FIG. 4 is a schematic diagram showing a switch device according to a second embodiment of the present invention.

FIG. 4 is a schematic view showing the switch device 1 of the second embodiment. In the same manner as in the first embodiment, the rotor 22 is rotatable when the mechanical key 40 is inserted in the key slot 11. Further, the key cylinder 20 is configured to enable the rotor 22 to be pushed after the rotor 22 is rotated. The pushing of the rotor 22 starts the engine.

The key cylinder 20 includes a rotor 22 and a rotor case 21, which accommodates the rotor 22. A flange 27 extends from the rotor 22 near the key slot 11. A tab 23 extends from the outer surface of the rotor 22. A guide groove 24, which receives the tab 23, extends along the inner surface of the rotor case 21. FIG. 5A is a deployment diagram showing the guide groove 24. The guide groove 24 includes a arcuate first guide groove 24a, which extends in the circumferential direction of the rotor case 21, and a linear second guide groove 24b, which extends in the axial direction of the rotor 22 from one end of the first guide groove 24a. The axial length of the second guide groove 24b is slightly greater than the distance between the extension 32 and the switch 33. Accordingly, when the rotor 22 is pushed, the extension 32 of the push button 31 pushes the switch 33 before the tab 23 reaches the end of the second guide groove 24b. In the same manner as in the first embodiment, the push button 31 incorporates the primary coil 34.

A circuit board 25 is arranged in the rotor case 21 at a position that is slightly closer to the end face from the middle portion. The circuit board 25 includes four contacts 25a, which come into contact with the projection 19 and which are arranged in correspondence with the moving path of the projection 19. The four contacts 25a correspond to operation states represented by "LOCK", "OFF", "ACC", and "IG-ON". A spring 26 is arranged between the circuit board 25 and the end face of the rotor case 21. The spring 26 urges the circuit board 25 toward the rotor 22.

When the rotor 22 is rotated and moved, the guide groove 24 guides the tab 23, which rotates with the rotor 22 to the "LOCK", "OFF", "ACC", and "IG-ON (PUSH ST)" positions. The rotor 22 is movable from the "LOCK" position to the "IG-ON" position with the first guide groove 24a guiding the tab 23 when the mechanical key 40 is inserted in the key slot 11. When the rotor 22 is pushed at the "IG-ON" position, the second guide groove 24b guides the tab 23 to an "ST" position. This moves the push button 31 with the rotor 22. As a result, the extension 32 of the push button 31 activates the switch 33. Then, the switch 33 provides the power supply ECU 2 with an ON signal.

The push button 31 of the push button switch 30 includes a stepped portion 37, which functions as a stopper, extending inward from the wall of the hole 31a. The spring 16 urges the push button 31 so that the stepped portion 37 contacts the flange 27. Thus, when the mechanical key 40 is used, the rotor 22 is rotated with the flange 27 in contact with the stepped portion 37. When the rotor 22 is pushed, the push button 31 moves together with the rotor 22.

When the user pushes only the push button 31, the push button 31 moves independently from the rotor 22. The characters 36 marked on the push button 31 in correspondence with the selectable operation states differ from the characters 36 of the first embodiment. As shown in FIG. 5B, in the second embodiment, the characters 36 of "LOCK", "OFF", "ACC", and "IG-ON (PUSH-ST)" are marked on the push surface 31b. In the same manner as in the first embodiment, a guide (not shown) extending in the axial direction of the rotor 22 guides the extension 32 so that the push button 31 does not rotate about the rotor 22.

The operation of the switch device 1 in the second embodiment will now be discussed.

The starting of the engine with the push button switch 30 is performed in the same manner as in the first embodiment and will thus not be described. The starting of the engine with the key cylinder 20 will now be described. When the user inserts the mechanical key 40 into the key slot 11 of the key cylinder 20, the identification code of the transponder 42 and the identification code of the immobilizer ECU 35 are compared with each other. When the two identification codes match, the immobilizer ECU 35 provides the steering lock device 3 with an unlock signal and provides the power supply ECU 2 with the immobilizer verification signal. The steering lock device 3 unlocks the steering wheel in accordance with the unlock signal. When the user first inserts the mechanical key 40 in the key slot 11, the tab 23 is located at the "LOCK" position as shown by the broken lines in FIG. 5A. The user then turns the mechanical key 40 to the "LOCK" position. This guides the tab 23 with the first guide 24a to the "OFF" position as shown by the broken lines in FIG. 5A. Simultaneously, the projection 19 of the rotor 22 moves to the OFF contact 25a of the circuit board 25.

Figure 5A:
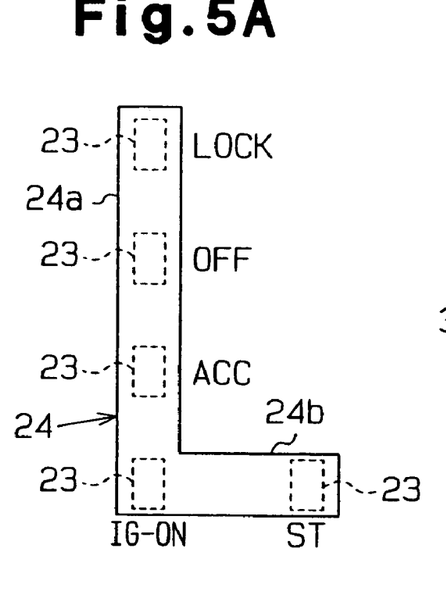
FIG. 5A is a development diagram showing a guide groove in the switch device of FIG. 4.
Figure 5B:
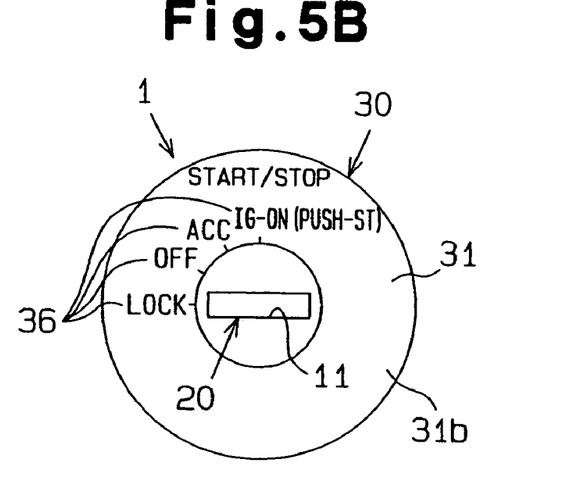
FIG. 5B is a plan diagram showing a push button in the switch device of FIG. 4.

As the user further rotates the mechanical key 40 from the "OFF" position, the first guide groove 24a guides the tab 23 to the "ACC" position as shown by the broken lines of FIG. 5A. Simultaneously, the projection 19 of the rotor 22 moves to the ACC contact 25a of the circuit board 25.

Then, as the user further rotates the mechanical key 40 from the "ACC" position, the first guide groove 24a guides the tab 23 to the "IG-ON" position as shown by the broken lines of FIG. 5A. Simultaneously, the projection 19 of the rotor 22 moves to the IG-ON contact 25a of the circuit board 25.

Subsequently, the user pushes the mechanical key 40 with the rotor 22. In this state, the second guide groove 24b guides the tab 23 to the "ST" position as shown by the broken lines of FIG. 5A. This moves the push button 31 of the push button switch 30 with the rotor 22 and pushes the switch 33 with the extension 32. In this state, the switch 33 provides the power supply ECU 2 with the ON signal. In response to the ON signal, the power supply ECU 2 provides the engine controller 4 with a start signal. The engine controller 4 then starts the engine in accordance with the start signal.

When the user releases his or her hand from the mechanical key 40 located at the "ST" position, the urging force of the spring 26 returns the rotor 22 to the "IG-ON" position. To stop the engine, the user turns the mechanical key 40 from the "IG-ON" position to the "ACC" position. As a result, the power supply ECU 2 provides the engine controller 4 with a stop signal. The engine controller 4 then stops the engine in accordance with the stop signal.

In addition to the advantages of the switch device 1 of the first embodiment, the switch device 1 of the second embodiment has the advantage described below.

The rotor 22 is movable in its axial direction. The pushing of the rotor 22 pushes the switch 33 of the push button switch 30 and starts the engine. In this structure, a START contact for starting the engine does not have to be formed on the circuit board 25 of the key cylinder 20. This saves costs.

It should be apparent to those skilled in the art that the present invention may be embodied in many other specific forms without departing from the spirit or scope of the invention. Particularly, it should be understood that the present invention may be embodied in the following forms.

Figure 6:
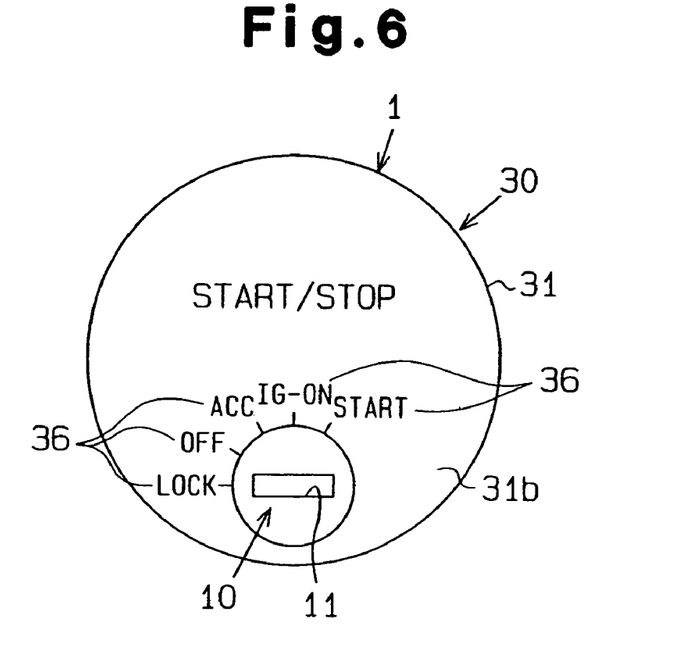
FIG. 6 is a plan view showing a push button according to a further embodiment of the present invention.

In the first and second embodiments, the key slots 11 of the key cylinders 10 and 20 are arranged in the center of the push button 31 of the push button switch 30. However, the key slot 11 may be located at a position separated from the center of the push button 31, as shown in FIG. 6. In such a structure, the area of the push surface 31b increases. Thus, the push button 31 is pushed with further ease by the user. In such a case, it is preferred that the switch device 1 be provided with a guide rod for guiding the movement of the push button 31.

The switch device 1 may be configured so that the entire key cylinder moves with the push button 31 of the push button switch 30 when the push button 31 is pushed. This may be achieved by using, for example, an additional coil spring and an additional switch. In such a case, the additional coil spring urges the rotor case 13. The additional switch is arranged to come into contact with the rotor case 13 when the rotor case 13 moves. In this structure, the user pushes the key cylinder with the mechanical key 40 inserted in the key slot 11. This moves the key cylinder so that the rotor case 13 pushes the additional switch.

In the second embodiment, the second guide groove 24b is located in correspondence with the "IG-ON" position. However, a groove similar to the second guide groove 24b may be formed at a position corresponding to, for example, the "LOCK" position or the "OFF" position.

In the first and second embodiments, the push surface 31b of the push button 31 is flush with the end face of the rotor 14 or 22. However, the push surface 31b may project from the end face of the rotor 14 or 22. This enables the user to push the push button 31 with further ease. It is preferred that the switch 33 be arranged so that when the push button 31 is pushed, the switch 33 is activated before the push surface 31b becomes flush with the end face of the rotor 14 or 22.

The edge of the wall defining the hole 31a of the push button 31 may be tapered. This prevents the grip 41 from interfering with the push button 31 when the user inserts the mechanical key 40 into the key slot 11.

The switch 33 of the push button switch 30 does not have to be a self-reset type push button switch. For example, a switch including a pair of electrodes may be employed. The two electrodes are respectively arranged in the opposing surfaces of the push button 31 and the rotor case 13. When the push button 31 is pushed, the two electrodes come into contact with each other. The contact between the two electrodes starts the engine. The push button switch 30 may include other known switches.

In the first and second embodiments, the smart ignition function enables the starting of the engine, and the push button 31 is pushed to start the engine. However, the engine may be started by pushing the push button 31 when the identification code of the mechanical key 40 matches the identification code of the memory 35a in the immobilizer ECU 35.

The switch device 1 of the first embodiment includes the key cylinder 10, which starts the engine by rotating the rotor 14. The switch device 1 of the second embodiment includes the key cylinder 20, which starts the engine by pushing the rotor 22. However, any type of key cylinder may be employed in the switch device 1 as long as the push button is located near the key cylinder.

The communicating means of the push button 31 is not limited to the primary coil 34 used in relation with the immobilizer function. The communicating means may have any structure as long as the communicating means is used for identification code comparison.

In the first and second embodiments, the push button 31 is annular. Instead, the push button 31 may have a polygonal shape, such as a square shape. Nevertheless, it is preferred that the antenna used in relation with the immobilizer function be annular.

In the first and second embodiments, the key cylinders 10 and 20 include the tumblers 15 to enable the rotation of the rotors 14 and 22 when the key groove of the mechanical key 40 properly engages the tumblers 15. However, the key cylinders 10 and 20 do not necessarily have to have the tumblers 15 since the identification codes are compared through the immobilizer function when the mechanical key 40 is inserted in the key slot 11. In such a case, a pin may be used to keep the mechanical key 40 held in the key slot 11 when the engine is running.

In the first and second embodiments, a wire, such as a lead line, or the like, connects the primary coil 34 and the immobilizer ECU 35. The spring 16 that urges the push button 31 may be used as part of the wire. In such a case, it is preferred that a spring made of material having low electric resistance be used.

In the second embodiment, the switch 33 is used by the key cylinder 20 and the push button switch 30. However, a further switch may be provided exclusively for the key cylinder 20. In such a case, the pushing of the rotor 22 pushes the further switch.

In the second embodiment, the switch device 1 is configured so that the push button 31 moves together with the rotor 22 when the rotor 22 is pushed. However, the switch device 1 may be configured so that the push button 31 does not move when the rotor 22 is pushed. In this structure, an additional switch that is pushed when the rotor 22 is pushed is necessary.

The present examples and embodiments are to be considered as illustrative and not restrictive, and the invention is not to be limited to the details given herein, but may be modified within the scope and equivalence of the appended claims.

What is claimed is:

1. A switch device for starting and stopping an engine, the switch device comprising:
a key cylinder having a key slot; and
a push button switch pushed to stop or start the engine, the push button switch including a push button surrounding the key slot, wherein application of a pushing force to said push button moves said push button inward independent of inward movement of said key cylinder, and wherein the key cylinder is rotatable independently from the push button switch when a mechanical key is inserted into the key slot.

2. The switch device according to claim 1, wherein the key slot is adapted to receive a mechanical key having a transponder, and the push button includes a communicating means for communicating with the transponder of the mechanical key.

3. The switch device according to claim 1, wherein the push button has a central portion through which a hole extends to receive the key cylinder.

4. The switch device according to claim 1, wherein the push button has a central portion separated from a hole that receives the key cylinder.

5. The switch device according to claim 1, wherein the key cylinder includes a rotor having an end face through which the key slot extends, with the push button being flush with the end face of the rotor.

6. The switch device according to claim 1, wherein the key cylinder includes a rotatable rotor that becomes pushable after being rotated, the push button being configured to move simultaneously with the rotor when the rotor is pushed.

7. The switch device according to claim 6, wherein the rotor includes a flange, and the push button includes a stopper engaged with the flange to move the push button together with the rotor when the rotor is pushed.

8. The switch device according to claim 6, wherein the key cylinder includes a rotor case for accommodating the rotor, and the switch device further comprises a spring arranged between the push button and the rotor case to urge the push button.

9. The switch device according to claim 6, wherein the key cylinder includes a rotor case for accommodating the rotor, a circuit board arranged in the rotor case, and a spring arranged between the circuit board and an end wall of the rotor case to urge the circuit board toward the rotor.

10. The switch device according to claim 6, wherein the rotor includes a tab extending from its outer surface, the key cylinder includes a rotor case for accommodating the rotor, and the rotor case includes a guide groove formed at an inner surface of the rotor case for guiding the tab of the rotor.

11. The switch device according to claim 10, wherein the guide groove includes a first guide groove extending in a circumferential direction of the rotor and a second guide groove extending in a longitudinal direction of the rotor.

12. A switch device for starting and stopping an engine, the switch device comprising:
a key cylinder having a key slot; and
a push button switch pushed to stop or start the engine, the push button switch including a push button, and the key slot being arranged in the push button, wherein application of a pushing force to said push button moves said push button inward independent of inward movement of said key cylinder, and wherein the key cylinder is rotatable independently from the push button switch when a mechanical key is inserted into the key slot.

13. A switch device for starting and stopping an engine, the switch device comprising:
a key cylinder having a key slot adapted to receive a mechanical key, the mechanical key including a transponder having a communication function; and
a push button switch pushed to stop or start the engine, the push button switch including a push button having a hole, the push button including a communicating means for communicating with the transponder, and the key slot being arranged in the hole of the push button, wherein application of a pushing force to said push button moves said push button inward independent of inward movement of said key cylinder, and wherein the key cylinder is rotatable independently from the push button switch when a mechanical key is inserted into the key slot.

14. The switch device according to claim 13, wherein the key cylinder includes a pushable rotor having a flange, and the push button includes a stopper engaged with the flange to move the push button together with the rotor when the rotor is pushed.

15. The switch device according to claim 13, wherein the push button has a central portion through which the hole extends.

16. The switch device according to claim 13, wherein the push button has a central portion separated from the hole.

17. The switch device according to claim 13, wherein the communicating means includes an antenna coil.

* * * * *